United States Patent
Seul et al.

(10) Patent No.: US 11,886,797 B2
(45) Date of Patent: Jan. 30, 2024

(54) PROGRAMMATIC CREATION OF DYNAMICALLY CONFIGURED, HIERARCHICALLY ORGANIZED HYPERLINKED XML DOCUMENTS FOR PRESENTING DATA AND DOMAIN KNOWLEDGE FROM DIVERSE SOURCES

(71) Applicant: BioInventors & Entrepreneurs Network, LLC, Warren, NJ (US)

(72) Inventors: Michael Seul, Basking Ridge, NJ (US); Reinhard Klemm, West New York, NJ (US)

(73) Assignee: BIOINVENTORS & ENTREPRENEURS NETWORK, LLC, Warren, NJ (US)

( * ) Notice: Subject to any disclaimer, the term of this patent is extended or adjusted under 35 U.S.C. 154(b) by 1 day.

(21) Appl. No.: 17/072,978

(22) Filed: Oct. 16, 2020

(65) Prior Publication Data
US 2022/0121807 A1   Apr. 21, 2022

(51) Int. Cl.
| G06F 40/143 | (2020.01) |
| H04L 67/02 | (2022.01) |
| G06F 8/30 | (2018.01) |
| G06F 40/131 | (2020.01) |
| G06F 40/154 | (2020.01) |
| G06F 40/134 | (2020.01) |

(52) U.S. Cl.
CPC .............. *G06F 40/143* (2020.01); *G06F 8/30* (2013.01); *H04L 67/02* (2013.01); *G06F 8/31* (2013.01); *G06F 40/131* (2020.01); *G06F 40/134* (2020.01); *G06F 40/154* (2020.01)

(58) Field of Classification Search
CPC . G06F 40/143; G06F 8/30; G06F 8/31; G06F 40/131; G06F 40/134; G06F 40/154; H04L 67/02
See application file for complete search history.

(56) References Cited

U.S. PATENT DOCUMENTS

| 2004/0015783 | A1* | 1/2004 | Lennon | G06F 16/258 715/255 |
| 2006/0248445 | A1* | 11/2006 | Rogerson | G06F 9/453 715/234 |
| 2015/0370913 | A1* | 12/2015 | Price | G06F 16/84 715/239 |
| 2017/0154019 | A1* | 6/2017 | Filipský | G06F 40/16 |
| 2017/0351989 | A1* | 12/2017 | Langdon | G06Q 10/06315 |

* cited by examiner

*Primary Examiner* — Quoc A Tran
(74) *Attorney, Agent, or Firm* — Eric P. Mirabel

(57) ABSTRACT

The invention relates to jCode programs which perform programmatic creation of strings comprising hyperlinked data and references thereto, and to the programmatic creation of documents, including XML documents and other format documents, referencing internal and external data sources. JSON can be used to express jCode programs, as can other custom designed languages, or XML or YAML.

8 Claims, 8 Drawing Sheets

PROGRAMMATIC CREATION OF DYNAMICALLY CONFIGURED, HIERARCHICALLY ORGANIZED HYPERLINKED XML DOCUMENTS FOR PRESENTING DATA AND DOMAIN KNOWLEDGE FROM DIVERSE SOURCES

BACKGROUND

Many instances in commerce call for the periodic creation of documents that, while not strictly standardized (such as a form), nevertheless share sections or paragraphs, and adhere to a format wherein generic text is populated with specific data items such as names, places, references to specific sources, etc. A very simple example would be a form letter, circulated by a government agency in which only the name of the recipient and the date of creation may change. More complex examples include the automatic creation of "stock" postings to newspaper or web pages reporting, say, the outcome of the latest baseball game or soccer match: as these stories tend to follow the same "script", they now are often generated by software (see e.g. wikipedia.org "Automated Journalism").

More complex still are scientific journal articles or other technical documents which traditionally have been the domain of highly skilled "knowledge workers." Nevertheless, even technical articles tend to follow a standard layout, say Introduction, Methods, Results, Discussion, Conclusions, References, Acknowledgements; for example, reports of clinical trial outcomes tend to follow not only a similar layout but tend to contain the same type of tables and figures, such as cohort demographics and survival curves and statistical tests, and they state a simple conclusion (comparing end points for "Case" and "Control" cohorts, say). Similarly, clinical laboratory reports, which are technical as well as legal documents, tend to provide results in the context of reference data (e.g. normal ranges, or population frequencies of genetic mutations) to facilitate interpretation by medical professionals; in addition, they may contain comments to point out "unusual" observations or recommendations. Also germane is the aggregation of data for display in a web portal, for example to present or visualize data aggregated from multiple primary sources or data acquired, by way of a URL, from a website.

At present, the creation of such documents usually falls to highly skilled individuals. Automating the creation of such a document, by a process wherein the final content of the document is determined at run-time, by evaluating conditions pertaining to the inclusion or exclusion of sections, subsections or statements, in a manner reflecting "context", will have the advantage of minimizing errors, while saving time and effort that now largely falls to human authors. While they may outsource the writing itself, they nevertheless are involved in reviewing, revising and finalizing drafts.

The challenges in automating the creation of a complex document are at least three-fold. Consider, for purposes of illustration, a clinical laboratory report, comprising different sections (Header, Results, Interpretation, Comments, References, etc.) displaying laboratory data and related items, for a specific patient, identified by a unique case identifier ("caseId"), in the context of section-specific text. This calls, first, for a process of acquiring caseId-specific data, by SQL query/-ies and processing query outputs so as to render them suitable for variable substitution in the provided "framing" text. However, just which text to display, or not to display, will depend on the type of test ("menuitem") of interest. Thus, the Reference Section of the report for cystic fibrosis carrier screening would list specific cystic fibrosis mutations probed, and their population frequencies, say, while, allele profiling of, say, the gene encoding Human Leukocyte Antigens ("HLA") would list common HLA alleles. Accordingly, this calls for the dynamic configurability of such a report, so as to determine the inclusion or exclusion status of specific text or in fact entire subsections. Finally, to augment the report, by referencing or displaying data from external domain knowledge sources, say a curated database of cystic fibrosis mutations describing their clinical significance, or a web service evaluating the linkage disequilibrium between alleles at different HLA loci, calls for the ability to submit appropriate requests to external knowledge sources, and the shaping of the data returned in response to such a request for display within, or along with, the report.

More fundamentally, the presentation of data in the context of domain-specific knowledge that provides context and interpretation, for example to guide decisions, faces a multiplicity of formats and representations. A prime example is the medical field, in which patient data are recorded daily, for thousands of patients, by many specialty labs including, say, molecular diagnostics, or immunogenetics or cytogenetics, on a multiplicity of instruments, while electronic health record systems frequently adhere to specific internal formats and representations.

This raises a "Many:To:Many" ("M:M") problem of transforming data and related domain knowledge from many original "input" formats into many "output" formats. This is akin to the problem of translating any of a multiplicity of human languages to any other, or that of translating any of a multiplicity of high-level programming languages into any of a multiplicity of assembly languages. A conceptual simplification is achieved by introducing an intermediate representation, in the form of a commonly spoken human language, or an intermediate representation of high level languages. see wikipedia.org "Intermediate Representation." The introduction of such an intermediate representation replaces the original M:M problem by the sequence of "Many:To:One" ("M:O") and "One:To:Many" ("O:M") transformations, thereby reducing complexity.

SUMMARY OF THE INVENTION

To address the challenges in the programmatic creation of hierarchically organized ("structured") documents and to address the more fundamental M:M problem in the setting of data and domain knowledge representations, the present invention discloses a j-code language and a j-code processor ("j-code machine" or "JCM") which produces XML as an intermediate representation for subsequent translation into many desired output formats, among these HTML or electronic data representations, e.g. Fast Healthcare Interoperability Resources ("FHIR").

jCode provides parameterized instructions, here termed "directives", preferably encoded in JSON (or related notations, see below) for acquiring and transforming items of data or domain knowledge; to place transformed items, by multi-level substitution, into a template ("framing text" which may be a URL, or may be the empty string), and for evaluating Boolean expressions that determine the inclusion or exclusion of DataStatements or KnowledgeStatements in a larger context, such as an XML document, where JCM parses and executes these instructions.

Also disclosed is a process for unsupervised or supervised assembly of Data—or KnowledgeStatements into a hierarchically organizeddocument ("StructuredDocument"). To illustrate the utility of the JCM, operating in tandem with a document assembler ("DocAssembler") for programmatically creating structured documents, the creation of a clinical laboratory report is exemplified, wherein the report is augmented by linking to external knowledge sources to provide context for, and thereby to guide the interpretation of the data in the report.

The JCM, in conjunction with a separate software agent, also referred to herein as a "DocAssembler", also facilitates the implementation of a system architecture for creating a library of domain knowledge, preferably in the form of XML documents, that may be referenced by disparate applications drawing on one or more library items to create applications and services for presenting and visualizing data in various contexts, and translating them to desired output formats. One such application is that of programmatically producing annotated, hyperlinked structured documents such as clinical laboratory reports or other documents that adhere to a given structure.

BRIEF DESCRIPTION OF THE DRAWINGS

The following detailed description can be read in connection with the accompanying drawings in which like numerals designate like elements and in which.

DEFINITIONS

Figure 1:
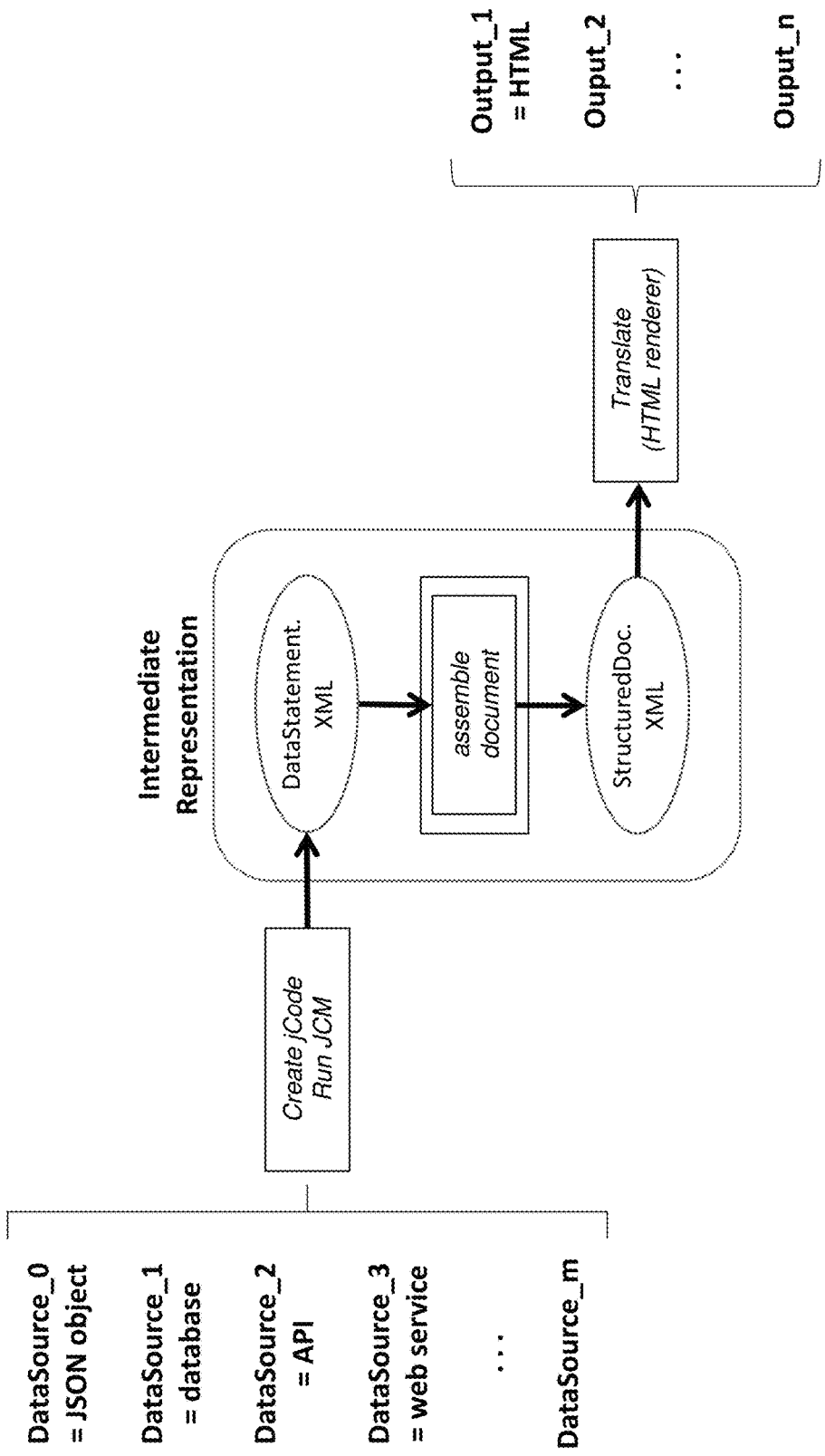
FIG. 1 is a schematic illustration of intermediate representation connecting multiple data sources to multiple outputs; operations are indicated by rectangles and intermediate results are indicated by ellipses; a rectangle with double-border indicates an operation for which further detail is provided either (as in this case) in a separate figure or (as in other cases) in the same figure.

API=Application Programming Interface See wikipedia.org "API"
Dynamic=determined during program execution
FHIR=Fast Healthcare Interoperability Resources
GSS=General (Document Element) Selection and (Variable) Substitution
HTML=HyperText Markup Language See wikipedia.org "HTML"
Hyperlink=standardized, programmatically executable reference to external (target) resource in a source document
JSON=JavaScript Object Notation See wikipedia.org "JSON"
Structured Document=Hyperlinked, Hierarchical XML Document
URL=Universal Resource Locator
XML=Extensible Markup Language See wikipedia.org "XML"

DETAILED DESCRIPTION

It is to be understood that both the foregoing general description and the following detailed description are exemplary and explanatory and are intended to provide further explanation of the invention as claimed.

Unless otherwise defined, all technical and scientific terms used herein have the same meaning as commonly understood by one of ordinary skill in the art to which this invention belongs. Still, certain elements are defined for the sake of clarity and ease of reference.

The present invention comprises: a novel code for compactly stating "directives" for acquiring, transforming and formatting data from diverse sources of data or domain knowledge in the form of DataStatements or KnowledgeStatements, and selecting or deselecting such statements for placement into a larger context, such as a document; a parser and processor to execute these directives; and an assembler for creating hierarchically organized ("structured") documents. DataStatements and KnowledgeStatements, as well as StructuredDocuments assembled from these statements, all preferably expressed in XML, provide an intermediate representation of data and domain knowledge from which to translate into multiple output formats—see also FIG. 1. Several Examples also are provided.

I—jCode

To compactly state parametrized instructions for acquiring, transforming, formatting and selecting items of data and domain knowledge from a multiplicity of disparate sources, a new programming language, also termed jCode, is herein disclosed.

In a preferred embodiment, jCode conforms to the JSON syntax for specifying key:value pairs, but uses that notation, beyond the original functionality, to state parametrized instructions ("directives") such that "key" denotes the name of a function or a function parameter name and "value" comprises a parameter, or argument consumed by that function. These functions are recognized by the jCode processor, also referred to herein as "j-code machine" ("JCM"), which parses and executes jCode to produce DataStatements and KnowledgeStatements, preferably in XML or in an alternative notation such as JSON or YAML.

A DataStatement is an XML object with one or more of the following attributes:
  the opening tag whose name ("value") is assigned to the key "reference";
  an attribute, "header", inside the opening tag;
  a "body" comprising text or a complex object such as a table or a hyperlink optionally "format" relating to downstream processing including rendering;
  optionally, an "inclusion" status attribute, pertaining to the disposition of the statement within a larger context such as that provided by a larger document;

wherein header and body are produced by respective namesake directives in jCode, comprising a template (aka "framing text"), optionally comprising text and zero or more substitution variables that are instantiated with items representing raw data, for example from a measurement or a test, recorded in a database or other data source; or comprising, in some embodiments, one or more substitution variables only. An example of a DataStatement is given in Example 1.

A KnowledgeStatement is a DataStatement with framing text whose substitution variables are instantiated with items of domain knowledge acquired from internal or external knowledge sources including web sites or web services. In contrast to data items, items of domain knowledge facilitate the interpretation of data items in a, say, clinical or other context; this is illustrated in Example 2.

Related DataStatements and KnowledgeStatements may appear within the same "block" of a larger document, wherein a "block" may represent a section or a subsection or a paragraph. More generally, combined DataStatements and KnowledgeStatements also arise if a framing text calls for variable substitution from data as well as knowledge sources.

In contrast to the typical use of JSON, YAML, XML and other notations or mark-up languages for serializing data or specifying configurations—including configuration languages designed to specify values for configurable items to a configuration management system (see e.g. Terraform website, Hashicorp, under tabs: "configuration/syntax-json.html")—jCode directs the JCM, to orchestrate a complex sequence of data acquisition and output transformation operations. The operation of the JCM is disclosed herein below. As it resides in the file system, or in an external service, jCode is independent of any application code that invokes it so that modifications to the former do not require modifications (and re-testing) of the latter.

The use of JSON to express jCode programs is a convenience, reflecting the hierarchical nature of jCode programs, and allowing the use of an existing JSON ecosystem, from editors to validators to parsers.

Alternative formalisms, such as XML, YAML, or custom designed, are conceivable, although not preferred at the present time.

Figure 2:
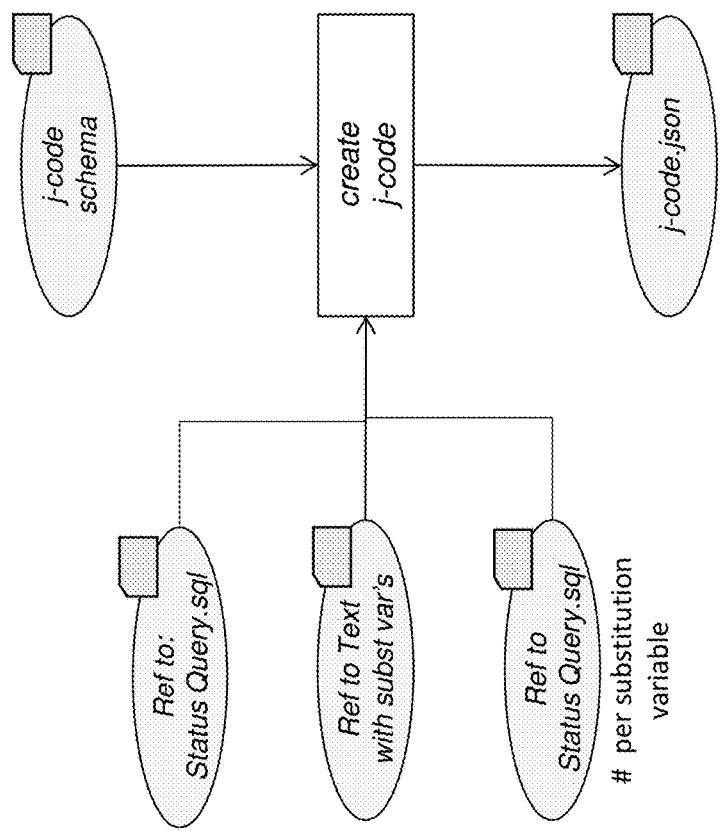
FIG. 2 is a data flow chart detailing the principal inputs and outputs for the step of creating j-code (and the file holding said code); the folder icon indicates files or folders; the cylinder symbol indicates a database table.

A jCode program has the following structure (in this sequence)—see also FIG. 2
1. Reference—an identifier for the Statement
2. Inclusion status specification (aka "Selection Directive") comprising
   2.1 one or more references to .sql files, each containing a SQL condition query;
   as with all SQL queries referenced by a jCode program, context variables may be used in condition queries
   2.2 a Boolean expression relating to inclusion status; JCM evaluates the expression by invoking an expression interpreter, using a simple expression language designed for this purpose
3. Header—the displayed title of an XML document block, say a report section;
4. Body—the content of the Data/KnowledgeStatement;
5. For both header and body, a framing text, with 0 or more embedded variables, each of these with one or more occurrences;
   Framing text may comprise any string, including a URL, say, or in fact may comprise no text, but simply one or more substitution variables in which case these may be instantiated with complex data types such as a JSON object 6. Data Acquisition, Transformation & Multi-Level Substitution Directives
   For each variable in the header and body framing texts:
   6.1 a data acquisition specification comprising
       type—currently: "db sequential", "db conditional", "web", "link", "string"
       spec—type-dependent directives
           if type is "db sequential or db conditional", then spec comprises database identifier+list of references to .sql files, each containing a SQL data query;
           if type" is "web" or "link", then spec is a URL template with 0 or more embedded variables (which may be nested);;
           if type is "string", then spec is a literal string, optionally with embedded context variables (further described below).
   6.2 an optional default substitution (if no data returned from the data source)
   6.3 an output transformation specification: to transform acquired data, often in the form of table objects, into a suitable substitution value for the target variable, a variety of directives, each with optional parameters, are available for insertion into the Output Transformation section of jCode, including:
       Transformation into flat string
       Transformation into XML table, with option to automatically hyperlink column values
       Transformation into XML list, with option to automatically hyperlink list elements
       Transformation into hyperlink for link type
7. Optionally: HTML Formatting Directives
Data Statements are XML documents where each XML tag contains a list of XML attributes in accordance with the XML intermediary document schema; one such attribute, format, produced by this directive or, if the directive is omitted, automatically by JCM, contains a prescription for downstream transformation into other representations and formalisms, notably a transformation into HTML.

Thus, jCode:
supports the evaluation of Boolean expressions
supports input operations (as with programming languages generally)
supports control flow (similar to the SQL CASE statement) applied to arrays of SQL queries
produces output (as with computer programs generally)
To this end, jCode invokes functions, recognized by the jCode parser and executed by the jCode processor. Several input/output transformation options are enumerated above.

jCode Functions—jCode programs invoke functions for data or knowledge item acquisition and transformation as well as for multi-level substitution of variables in framing text (including URLs) and for Data- or KnowledgeStatement selection for larger context that are recognized by the jCode processor (aka "jCode machine", or "JCM").

Among these functions, whose use is illustrated in Examples, are:
   base functions which implement common data acquisition and transformation operations; these functions include "body", "linkedsubstitution", "query", "outputFormat", "URL" and others; see also below "Hyperlinked Formatted Data or Domain Knowledge Items"
   context-specific functions which primarily implement XML- to—cXML conversions, wherein XML here refers to a document comprising all data or knowledge items of interest, presented in general XML, while cXML refers to context (or application)—specific XML comprising instructions that anticipate the format and/or schema of the eventual output destination such as HTML or FHIR; context-specific functions include "format" and "level", the latter facilitating, for example, the rendering of sections or subsections in accordance with their position in a hierarcFhical document.

Functions available to jCode programs include the following:

| Function Name | Brief Description |
| --- | --- |
| body | Generates the content (body) of the Statement instantiated from framing text and 0+ embedded substitution variables |
| header | Generates an XML header attribute for the Statement instantiated from framing text and embedded substitution variables (if any) |
| linkParameterSubstitutions | Replaces URL parameter variables in hyperlinks/web service or REST API data fetches with specific values |
| outputFormat | Transforms data fetched from a data source prior to instantiating a substitution variable with the data |
| queries | Retrieves one or more SQL queries, each from a designated file, and executes all queries sequentially or until a query has returned >0 rows, to provide data for a variable substitution |
| status | Evaluates conditions for including/excluding the Data/KnowledgeStatement |
| substitution | Instantiates substitution variables in framing texts with specific values drawn from diverse data sources |
| url | Generates an HTTP request target for a hyperlink or for a web service/REST API data fetch |

Further, jCode programs of either type that are invoked frequently may themselves be invoked as jCode functions; these higher level functions again conform to the key:value syntax, but the "value" (which previously represented a scalar) now represents a complex data type such as a list holding all requisite parameters for the jCode program so invoked.

In a preferred embodiment, to extend the set of functions, for example so as to facilitate the creation of cXML for a new output format, a "plug-in" mechanism may be used. The plug-in mechanism allows third-party developers to implement abstract JCM functions to specifications defined by JCM and deploy them to a JCM installation, for example in a dedicated plug-in directory. The JCM may load such plug-ins at runtime and execute them to perform the same abstract task as directed by the specific plug-in implementation. As an example, consider a convert function that the JCM may specify where the specification includes the valid parameters and return values as well as the semantics of convert, the latter being conversion of generic XML to cXML. A third-party developer may implement convert in such a way that the cXML output supports the generation of PDF documents, as opposed to, say, HTML or FHIR.

At its most elementary level, jCode may direct simple variable substitution to display or store formatted data items as a string, in a manner equivalent to the string formatting function sprintf( ) in C or other high level programming languages. However, more generally, jCode provides compact directives for handling the acquisition of complex data objects from diverse data or knowledge sources and for transforming such objects. Thus, by invoking a set of base ("built-in") functions, jCode handles tables returned by SQL queries to internal or remote databases; other data structures, including JSON, XML or HTML returned by API requests or provided, for example, to capture specific data inputs provided interactively by prompting users; or items obtained by invoking web services, wherein these items themselves may contain variables indicating nested ("multi-level") substitution.

In particular, the substitution is not limited to scalar data types, but may extend to entire XML objects which may represent entire database tables returned by a query or structured data objects returned by a REST API.

In addition, jCode directs the evaluation of Boolean expressions over elements that are themselves generated by SQL queries, so as to dynamically determine the inclusion or exclusion of a given DataStatement or KnowledgeStatement within a larger XML document. This is illustrated in Example 4 ("Evaluating a Boolean Expression for Determining Inclusion Status: Selection") and elaborated further in connection with the disclosure of the jCode processor, below.

Figure 7:
FIG. 7 shows the HTML output and the graphic display for "Hello World" (created by Michael Cheal), produced by clicking the link in the HTML output.

As a first illustration of a jCode program, consider the canonical "Hello World." See FIG. 7. These two lines of jCode:

```
{
    "reference": "helloWorldExample",
    "body": { "framingText": "Hello World!" }
}
``` produce this XML statement, with header:
<helloWorldExample header="Hello World Example">Hello World</helloWorldExample>

In contrast to this minimalist output, the jCode in Example 3 ("Hello World as a Hyperlinked Phrase"), produces an XML statement which, when transformed into HTML and rendered in a web browser, yields the hyperlinked phrase "Hello World" which in turn points to a graphic available at a specified url. This illustrates the type of operation for which jCode was designed—several additional examples illustrate other aspects of jCode, notably the handling of complex data objects.

Vectorizing Variable Substitution—An example of a complex data transformation is implemented in the form of the JCM function "Column Decorator" which vectorizes variable substitution so as to handle an array of substitution values for a given framing text. Specifically, this function simplifies a data transformation directive for acquired data in the form of a table, such that the values in a designated column of such a table represent substitution variables. This is useful, for example, when instantiating multiple URLs, as illustrated by examples, below. However, this function may be used with any framing text to generate multiple instances of the framing text with different substitution values.

Generating jCode—In one embodiment, jCode may be created manually by editing templates (which conforms to an underlying jCode schema). In a preferred embodiment, jCode also may be generated by way of a special-purpose GUI displaying widgets prompting the user to select or enter framing text, to form key:value pairs and to choose jCode functions from a menu of functions and enter their desired parameters.

II—Executing jCode: The jCode machine ("JCM")

JCM executes jCode to produce a DataStatement or a KnowledgeStatement (or blocks of such statements) in XML.

Figure 3:
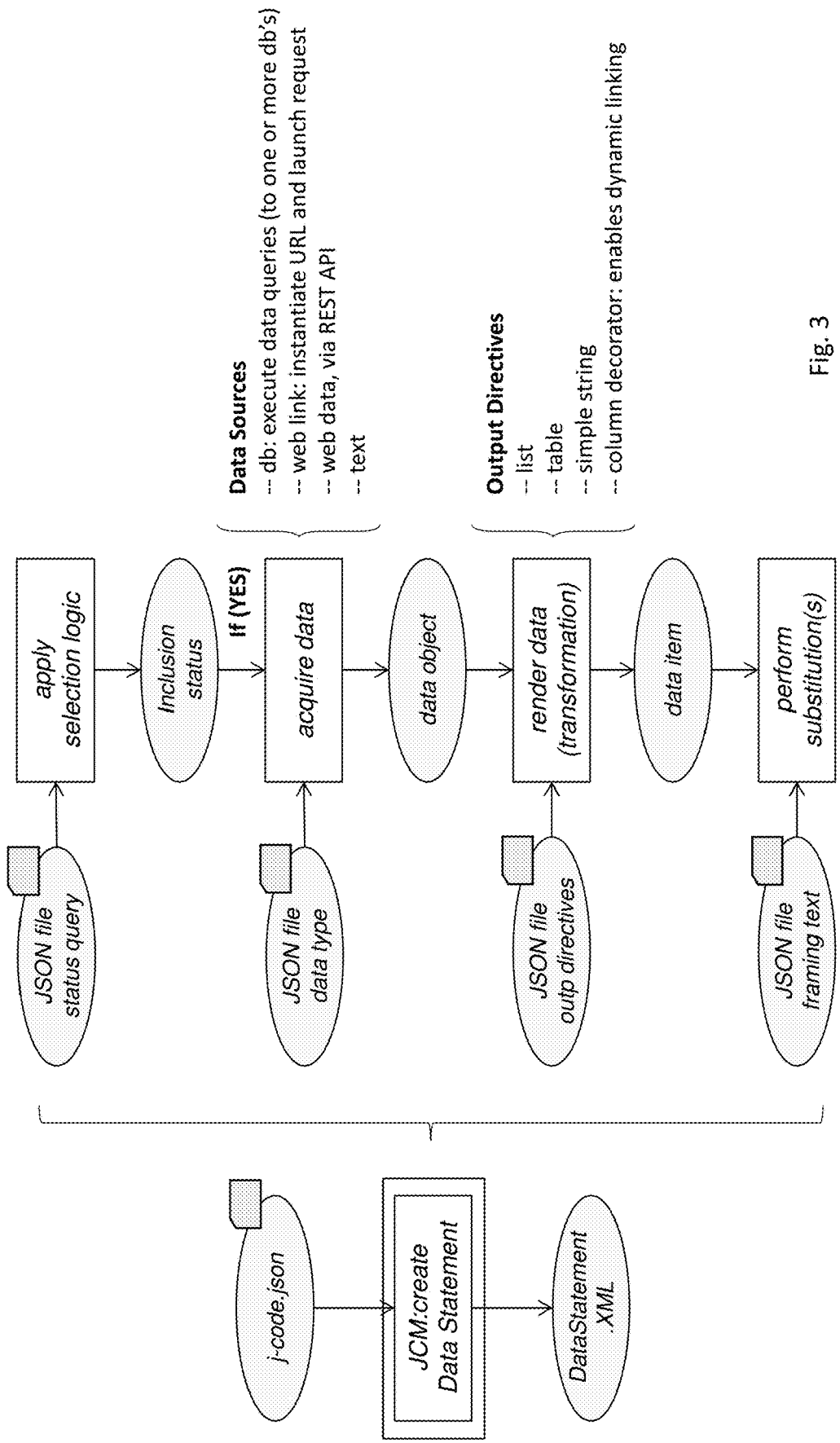
FIG. 3 is a data flow chart detailing principal steps (rectangles) and, for each step, the principal inputs and outputs (ellipses), in creating a Data Statement; annotations illustrate "Data Sources" and "Output Directives"; steps in doubly framed rectangles are detailed in subsequent figures.
Figure 4:
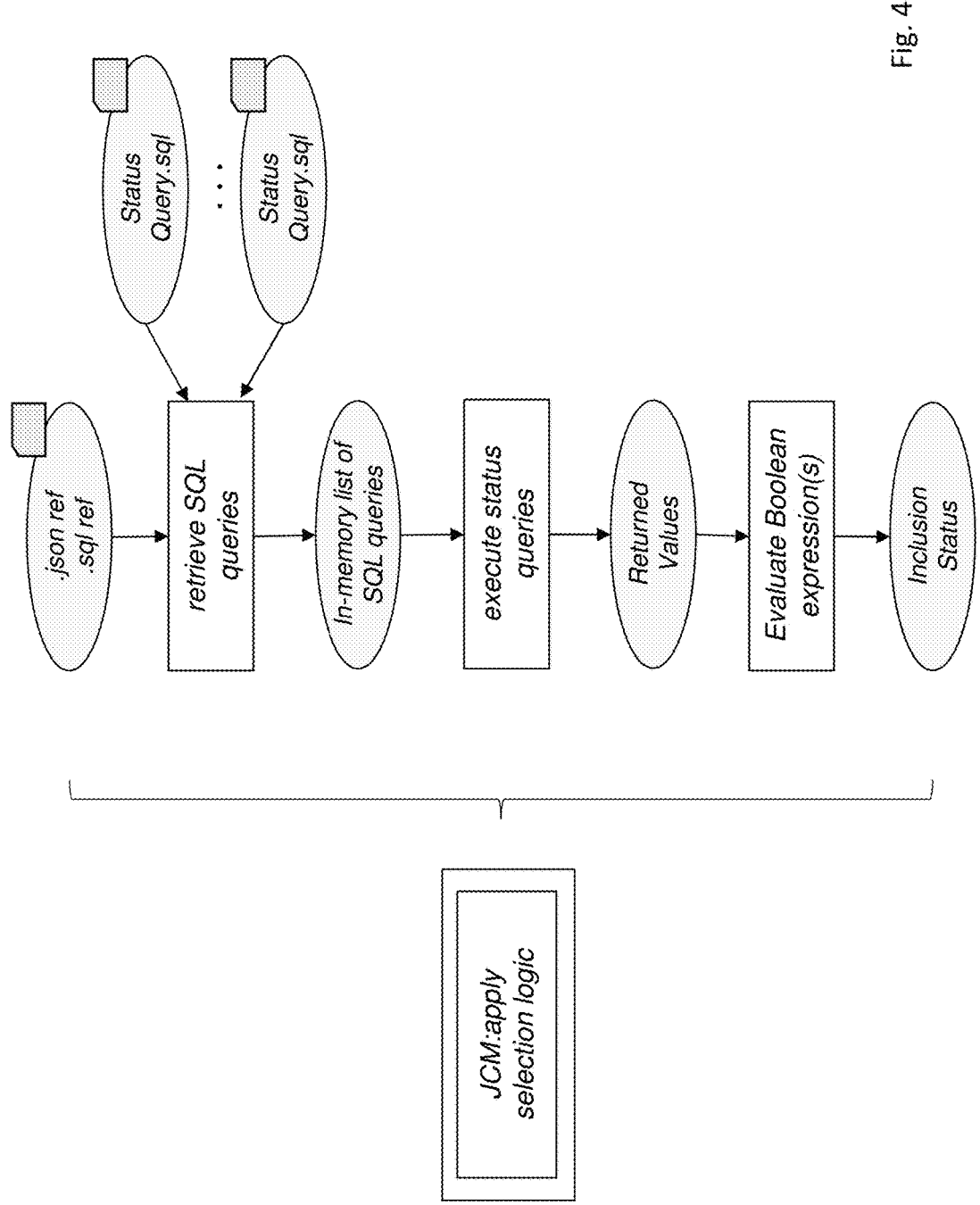
FIG. 4 is a data flow chart detailing principal steps (rectangles), and for each step the principal inputs and outputs (ellipses), in the process of selecting an item, by status queries for determining certain conditions relating to the inclusion (or exclusion) status of the item in a larger document.

Specifically, the JCM operates as follows to produce such a statement—see also FIG. 3:
1. execute all database queries referenced in the status directives
2. determine inclusion status (see FIG. 4)
3. if "selected", then: produce content, for "header" and "body", by substituting the variable(s) in the respective framing text with data items, as prescribed by the jCode.

The substitution is highly dependent on the type of actual data acquired which must be transformed so as to enable substitution. To that end, several "built-in" JCM functions are provided to handle disparate types of data sources, including: database data, web services, REST APIs, XML, JSON and text including text derived from natural language processing.

Context Awareness—JCM has a notion of context, which is a container of runtime key/value pairs, compiled by JCM from its operating environment. Thus, jCode may contain context variables that the JCM process substitutes with actual values from its context prior to execution; in particular, the data acquisition parameters in jCode, such as SQL statements, may contain such context variables. For example, as part of a clinical reporting system, JCM may store a patient ID and a case ID, and then use these to perform substitutions on (one or more) context variables—see also Example 5 ("Context Awareness").

Hyperlinked Formatted Data or Domain Knowledge Items—Using its multi-level substitution functionality, JCM can create dynamic links to external data and domain knowledge sources such as, say, content of linked web sites to provide information pertaining to specific data items in the DataStatement. This is illustrated, for 2-level substitution, in Example 6 ("Creating a Hyperlinked Data Statement") and Example 7 ("Vectorized Creation of Hyperlinked DataStatements").

The programmatic linking of case-specific data to external knowledge sources makes it possible to maintain up-to-date information to provide context ("living document") and thereby to support data interpretation, for example in the context of clinical decision support. As the content of these external sources changes, re-execution of the same jCode automatically updates DataStatements and Structured Documents of which they may be a part, as described below.

Implementation—In one embodiment, JCM is implemented in C# or other high-level language; in another embodiment, JCM may be implemented in scripting language such as PERL or Python, or in a powerful language such as Clojure. In a preferred embodiment, implementation of the JCM would take advantage of the functionality provided by PERL to: parse framing texts for @<var>@ variables; perform variable substitution in framing texts, including replacement of context variables with the value(s) stored in the JCM context container; parse and evaluate Boolean status expressions; and to facilitate validation of jCode directives involving function names, keys and values.

III—Creating Structured Documents By Assembly of Data—and/or KnowledgeStatements In a preferred embodiment, a hierarchically organized ("structured") XML document may be assembled from DataStatements and KnowledgeStatements by a separate program, also referred to as a DocAssembler, in accordance with the specification of a document configuration, preferably a table, also referred to herein as a "DocConfigTable". Such documents, and indeed individual constituent Data- and KnowledgeStatements, provide an intermediate representation of the input data and domain knowledge, in XML, suitable for subsequent translation into many output formats, including rendering in HTML.

Supervised vs Unsupervised Assembly The DocAssembler may operate without further input ("unsupervised assembly") other than the document configuration and the intended Data- and KnowledgeStatements, or it may accommodate direct user input ("supervised assembly"), for example in the form of modifications to the document configuration. An instance of supervised assembly is the guided creation of workflows (see also below).

Figure 6:
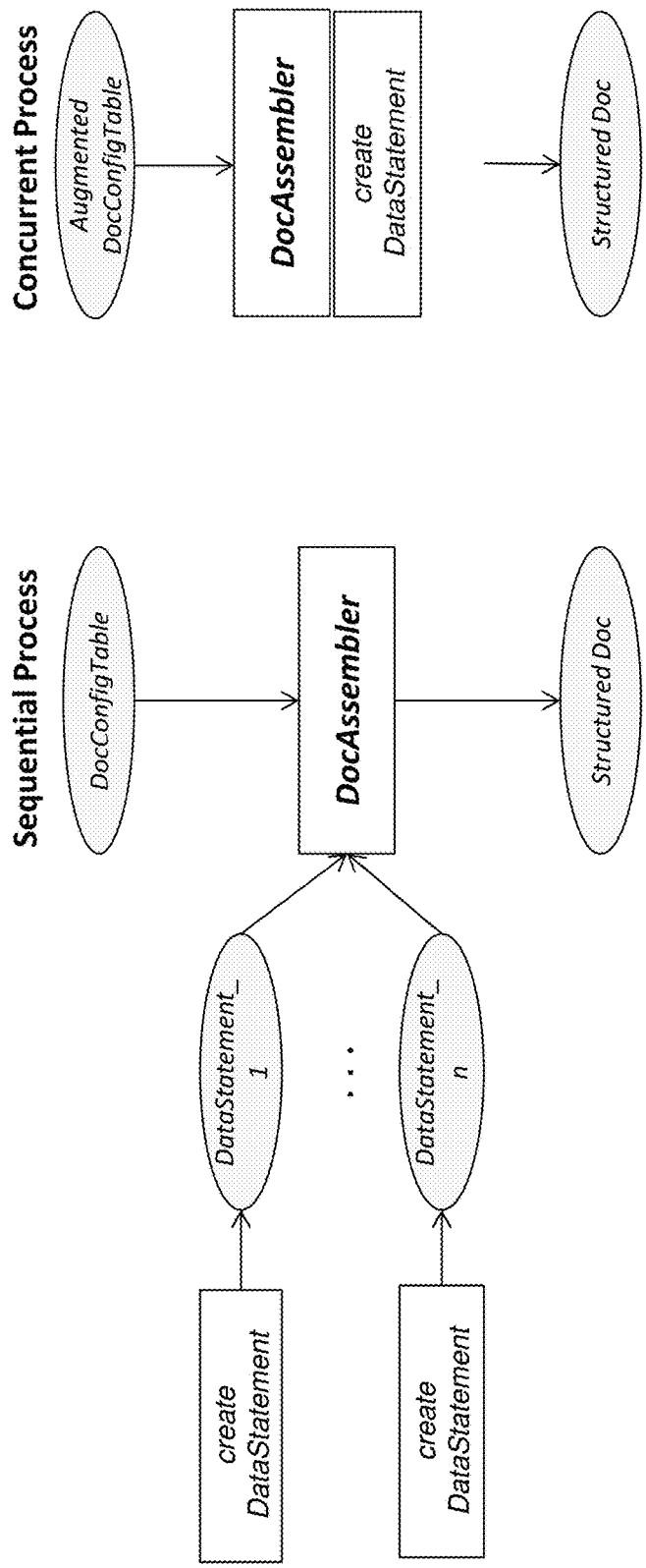
FIG. 6 is a data flow chart illustrating a sequential process of creating Data- and/or KnowledgeStatements and assembling these into a structured document vs a concurrent process wherein the document assembler invokes the JCM to create Data (and/or) KnowledgeStatements at assembly time.

Sequential vs Concurrent Assembly The DocAssembler may operate in accordance with a first embodiment wherein jCode execution and document assembly are performed sequentially or, in accordance with a second embodiment wherein jCode execution and document assembly are performed concurrently—see also FIG. 6.

In the sequential process, the DocAssembler assembles previously generated DataStatements and KnowledgeStatements which are referenced in the document configuration, preferably by way of the "reference" attribute in each statement (see above). After matching the "reference" attribute of individual statements to entries in the document configuration, it reads the "inclusion status" attribute of individual statements, and accordingly (i.e. in accordance with the nesting and sequencing in the configuration) places selected statements into the document. This is illustrated in Example 8 ("Unsupervised Document Assembly From User Input Collected in a JSON Object") for the assembly of a document using items of data and domain knowledge solicited from a user by way of a web-GUI. The assembly of pre-executed Data- and KnowledgeStatements permits the reuse of these Statements by the same or different applications, without altering the content of the Statements and without incurring the "cost" (time+computing resources) of generating the Statement.

In the concurrent process, the DocAssembler invokes the JCM to execute jCode for generating Data—and/or KnowledgeStatements, including the determination of inclusion status, in real-time. In this process, the document configuration provides a reference, not to completed Data—or KnowledgeStatements, but to the jCode modules that are to be executed to produce those statements. Concurrent processing permits the application of conditions that may only exist at assembly time, for example in the case of user-supervised assembly; alternatively, this will be the preferred embodiment when the Inclusion/Exclusion conditions pertaining to individual DataStatements are dictated by context that applies to the document as a whole.

Document assembly by this method of the invention is illustrated in Examples 9 ("Creating A Structured Document By Assembling Data- and KnowledgeStatements")

Figure 5:
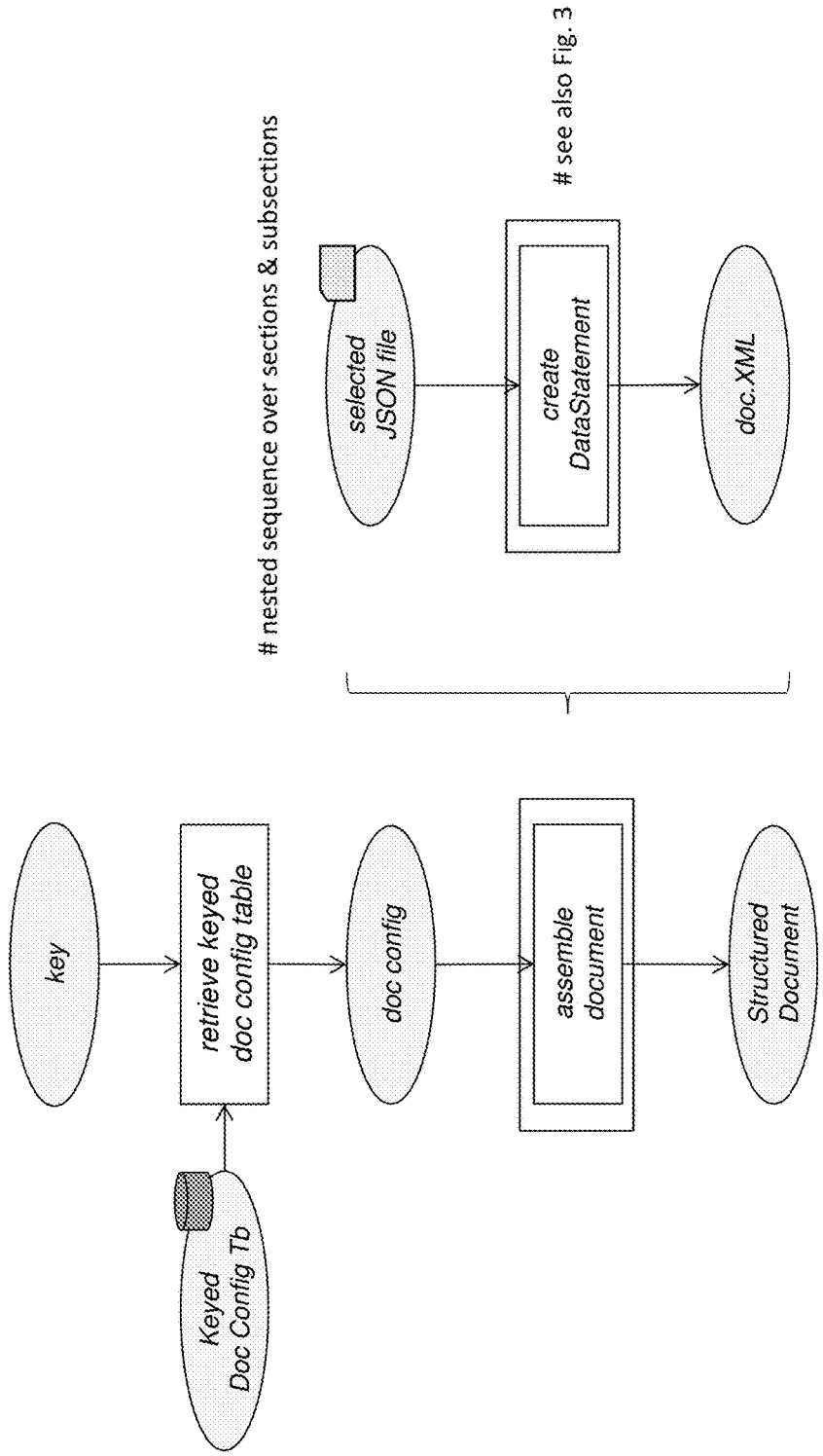
FIG. 5 is a data flow chart identifying principal steps (rectangles), and for each step the principal inputs and outputs (ellipses), in producing a structured document.

Specifically, the DocAssembler operates as follows—see also FIG. 5:
1. take as input an identifier ("key") for a database-stored document configuration; in a preferred embodiment, the document configuration is specified in a document table
2. retrieve the identified document configuration from the database and store it in memory for processing —
3. in accordance with the sequencing and nesting definition in the document configuration, construct a hierarchically organized document.

The document configuration consists of:
a. Nested sequencing of sections and subsections, each of these comprising one or more DataStatements or KnowledgeStatements b. For sequential processing:
  i. Reference to DataStatements or KnowledgeStatement (namely by way of the "reference" attribute) and headers, that identify their destination within the document (e.g. section or subsection or paragraph)
c. For concurrent processing:
  i. Reference to a jCode directive comprising one or more query references, where each reference is the name of a .sql file containing a database query
  ii. Reference to selection directives in the form of mappings from Boolean expressions over query results to document section identifiers; for example (A/B) & !C=> AcknowledgmentSection which would be interpreted as: if the results of the executed queries contains value A or contains value B but does not contain value C then include the AcknowledgmentSection—see also FIG. 3

In a preferred embodiment, the document configuration is in the form of a table which provides for nesting by listing parent references to blocks of content, e.g. sections of the document, in a first column and giving references, e.g. to sub-sections, in a second column, wherein entries in the latter column may (re-appear) in the former column; a third column holds an index indicating the sequencing of sub-section within a section. In addition, for concurrent processing, such a table will comprise an additional column providing a reference to a jCode program.

By dynamically controlling the selection of individual DataStatements and KnowledgeStatements, or the selection of variants of desired "framing text" for included statements, many different documents (of related structure) may be created from the same jCode directives. Further, by linking to external data sources, the assembler creates a "living document" whose content may change as context (dictating the value of Boolean expressions) and external knowledge sources change.

DataStatement and KnowledgeStatement API Preferably, especially for remote invocation, the DocAssembler references individual DataStatements and KnowledgeStatements by way of an API, implemented as a micro service (see also wikipedia.org "Microservices"). That is (referring, for simplicity's sake to DataStatements only), the DataStatement API is a server offering a REST API and specializing in the implementation of a narrowly focused functionality, namely the generation or retrieval of a single DataStatement.

The API would offer a function generateDataStatement (JsonObject jCode, List<String> sq/Statements) where sq/Statements is a (possibly empty) list of strings, each forming a valid SQL statement. That is, the jCode for data acquisition from a database contains, in sq/Statements, the second parameter for generateDataStatement, a list of SQL queries; note that with a REST API, to be invoked by a remote client, the server does not have access to the same filesystem as the client and therefore the sq/Statements would replace the set of actual .sql files in a file system in our current implementation.

The return value of generateDataStatement would be a string representation of an XML document ("XML block"). Not described here are the typical security and access mechanisms that allow only properly authenticated and privileged clients to invoke the REST API.

DocumentAssemblyAPI Preferably, especially for remote invocation, this API also is implemented as a micro service; that is as a server offering a REST API exposing a narrowly focused functionality, namely the generation of an XML document. The API would offer two functions 1. For concurrent processing: generateDocumentFromJCode(Config documentConfiguration, List<JsonObject> jCodePrograms, List<List<string>> sq/Statements)
2. For sequential processing: generateDocumentFromXml(Config documentConfiguration, List<String> xmlBlocks, JsonObject inclusionSpec=null)

Here, an "xmlBlock" may comprise one or more DataStatements and/or KnowledgeStatements.

Function generateDocumentFromJCode repeatedly invokes the DataStatement API under the direction of the documentConfiguration that specifies nesting and sequencing of DataStatements produced by executing the jCodePrograms on the JCM, to produce a hierarchically organized XML document. The return value is a string representation of that XML document. Thus, generateDocumentFromJCode constitutes a higher-level micro service, relative to the DataStatement API.

Function generateDocumentFromXml is designed to produce a hierarchically organized XML document as the return value from the list of XML "blocks" in parameter xm/Blocks, under the direction of the nesting and sequencing configuration in the documentConfiguration. If parameter inclusionSpec is not specified, all xmlBlocks will be absorbed into the returned XML document. Otherwise, the inclusionSpec must be a valid jCode inclusion specification, and the Document Assembly API evaluates the inclusion specification at execution time to determine which xmlBlocks to absorb into the returned XML document. The return value is a string representation of that XML document.

A Service for Dynamically Producing and Disseminating jCode In the preceding exposition, jCode programs are implicitly assumed to be directly generated and passed to the JCM by the client wishing to create a Data- or KnowledgeStatement. Alternatively, however, micro services may be offered for generating domain-specific jCode, and disseminating this code to clients (optionally employing a broker service). At the expense of an increased communication cost from a remote client/server interaction and decreased reliability, third-party jCode producer micro services offer these advantages:
  Development scalability: independent parties, specialized in the development of jCode for different (sub)domains, can concurrently release jCode
  Continuous deployment: producer micro services can release jCode upgrades at any time without requiring changes on the client side The Data Statement and Document Assembly APIs would leverage the availability of such jCode producer micro services and offer versions of their REST API functions that add these steps:
  Instead of specifying a jCode parameter, the client specifies a reference to a 3$^{rd}$ party jCode object; this may be a unique identifier for a jCode JSON producer micro service and a parameter identifying the specific jCode JSON object of interest to the client.
  The Data Statement/Document Assembly API requests and receives the specified jCode JSON object; the producer micro service generates the J-Code JSON object dynamically at request time, using request parameters from the Data Statement/Document Assembly API.

After completion of these steps, the Data Statement/Document Assembly API proceeds as described above.

Workflow Assembly In another respect, the DocAssembler also enables the creation of review "workflows". In one embodiment, instead of programmatically generating an entire document, such as a clinical laboratory report, the Assembler steps through the assembly process block by block, or section by section, while displaying data from external knowledge sources concurrently with each block or section under review, giving the reviewer the option to interactively select or de-select any such information for inclusion in the report itself.

In this mode, the DocAssembler offers an interactive user interface, for example a Web user interface (HTML+ JavaScript), that provides visual, interactive guidance to the user and widgets for retrieving or looking up background information in domain-specific knowledge bases, selecting or deselecting knowledge and data fragments for inclusion/ exclusion into/from the document, annotating the document, etc.

Pipelining: From Data and Knowledge Item Inputs to Specific Output Specifications With reference to the "Many: One, One:Many" mapping, we may regard any specific sequence of operations for converting particular instances of input, say data from a specific database, or knowledge items from a specific API, by way of an intermediate XML representation (such as that produced by the DocAssembler), to a particular instance of output, say, HTML (as in Example 9) or a FHIR specification, as a pipeline; that is, a pipeline comprises a specific sequence of operations of the type data—and/or knowledge items >XML>cXML>output specification, wherein cXML denotes "customized" XML, for example reflecting application-specific extensions. In this context, jCode may be viewed as a language that facilitates the design and implementation of such pipelines wherein XML and cXML represent a preferred intermediate representation. A pipeline with additional stages and intermediate representations also is conceivable; for example, a "storage" pipeline stage may store the input XML in a suitable storage device (database, storage Web service, file system) and then pass the input XML to the next pipeline stage, in this example without further transformations.

IV—Enabling a Common Services Platform

The jCode machine, exposed to other applications, including 3$^{rd}$ party applications, is part of a Common Services Platform and supports the production of XML documents ("xCode") as a universal intermediate representation, capable of inclusion into larger documents as well as translation into multiple desired output formats including rendering in HTML. In addition, a library of XML documents would serve as a resource for specific application development.

Common Services Platform ("CSP") comprises a set of (application or "app") development and deployment services, notably exposing the jCode machine as a service to third-party app developers to produce XML intermediary representation; specifically, the CSP comprises micro services that accelerate, simplify, and standardize the development and deployment of apps.

Offered micro services may include:
data storage and retrieval
security and access control
document transformation and retrieval/display, such as
    XML=>HTML, HTML=>PDF
UI framework for facilitating app user interface development and a common look and feel
subscription and payment service
data integration with domain-specific data sources One use of the Common Services Platform will be to enable the creation of applications by third parties, wherein the resulting applications in the "app library" may be made available as web-services or as stand-alone, operation-system specific downloadable executables.

EXAMPLES

Example 1: A DataStatement

This example illustrates the structure of a typical DataStatement (for clarity, optional attributes relating to inclusion status in a larger document, or rendering instructions relating to further processing have been omitted). The content represents the red blood cell antigen phenotype for a patient sample of interest, and the symbols "+", (w)+, (p)+ and "−" respectively indicate "expressed", "weakly expressed," "partially expressed" and "not expressed" (See web site isbtweb.org, under tabs: working-parties/red-cell-immunogenetics-and-blood-group-terminology/)

```
{
  "reference": "summary ",
  "header": {
    "framingText": "Results Summary",
    "substitution": { }
  },
  "body": {
    "framingText": "The patient has these predicted phenotype(s), by system: _@summary-predictedPhenotype@_",
    "substitution": {
      "summary-predictedPhenotype": {
        "type": "sequential",
        "spec": {
          "database": "fablab",
          "queries": [
            "summary-predictedPhenotype.sql"
          ],
          "default": "No data",
          "outputFormat": {
            "type": "string",
            "columnSeparator": ", ",
            "rowSeparator": "<br>"
          }
        }
      }
    }
  }
}
```

The jCode for generating the requisite DataStatement, shown above, comprises directives in the form of "key: value" pairs; however, several of the "keys", including: "header", "body", "substitution", italicized here for emphasis, in fact represent "built-in" JCM functions, and the "value" of such a formal "key" in fact represents a parameter for the function represented. In accordance with the JSON syntax, jCode is case-sensitive.

The code, aside from the abundance of braces reflecting the JSON syntax, and the nested scope of the directives, is self-explanatory. For example, the function "substitution" directs the steps invoked in acquiring data, by invoking the function "queries" with a parameter that represents a reference to a .sql file which holds the requisite SQL query, to a database called "fablab", to produce the table above; here and throughout, the symbols _@ and @_ delimit a substitution variable; next, the code specifies the transformation(s) for generating the string to be used for the variable substitution.

Specifically, the code comprises the directives for constructing "reference", "header" and "body", as shown in the box below. The "reference" here is assigned the value "summary"; the "header" directives here comprise only a framing text with value "Results Summary," without substitution variables, and the "body" directives comprise the instantiated framing text, "The patient has these predicted phenotype(s), by system: _@summary-predictedPhenotype@_"

wherein the one substitution variable, "summary-predictedPhenotype", delimited by _@ and @_ in the original framing text, has been instantiated by: first loading and executing a query which returns a table holding phenotypes, grouped by locus (Table 1 below); and then transforming this query output by serializing the table to produce a string (as directed by the row separator ";" in the DataStatement above).

TABLE 1

| Locus | PhenotypeByLocus |
|---|---|
| MNS | M+S−U(w)+ |
| RH | c+e(p)+hrS−hrB−CEAG− |
| KEL | K−k+Kpb+Jsb+ |
| FY | Fya−Fyb− |

The complete DataStatement, in XML, reads:
<summary header="Results Summary"> The patient has these predicted phenotype(s), by system: MNS, M+S−U(w)+; RH, c+e(p)+hrS−hrB−CEAG−; KEL, K−k+Kpb+Jsb+; FY, Fya−Fyb−</summary>

Example 2: A KnowledgeStatement

This example, illustrates the structure of a KnowledgeStatement, expressed in XML—for clarity, optional attributes relating to inclusion status in a larger document, or rendering instructions relating to further processing have been omitted). The content pertains to a method description which refers to LeanSequencing™, a method for analyzing variants in nucleic acid sequences that is further described in the cited literature reference.

The framing text, namely: "Genotypes were determined by _@lsqRefUrl@_" contains a substitution variable which is instantiated by this fragment of jCode:

```
"lsqRefUrl": {
    "type": "link",
    "spec":
    {
        "url": "https://bmcmedgenet.biomedcentral.com/articles/10.1186/s12881-020-01017-x",
        "label": "LeanSequencing (TM)",
        "linkParameterSubstitutions": { }
    }
}
```

This code generates the following XML:

```
<specialConfigurationIndication header="Special Configuration Indication" >
Genotypes were determined by
<a href='https://bmcmedgenet.biomedcentral.com/articles/10.1186/s12881-020-01017-x'
target='_blank'> LeanSequencing (TM) </a> </specialConfigurationIndication>
``` wherein the one substitution variable, "IsqRefUrl", delimited by _@ and @_ in the original framing text, has been instantiated by generating a hyperlink, delimited by <a and </a> which includes the label "LeanSequencing™"; the reference is "specialConfigurationIndication", and the header has the value="Special Configuration Indication".

Example 3: "Hello World" as a Hyperlinked Phrase

The jCode in this simple example illustrates producing a hyperlinked version of the phrase "Hello World".

```
{
    "reference": "helloWorldExample",
    "header": {
    },
    "body": {
        "framingText": "_@w@_"
        "substitution":{
            "w": {
                "type": "link",
                "spec": {
                    "url": "https://dribbble.com/shots/657044-Hello-World",
                    "label": "Hello World"
                }
            }
        }
    },
    "format": {
    }
}
```

That is, the XML statement generated by executing this code, when transformed into HTML, and rendered in a browser, becomes a hyperlinked phrase "Hello World"; when clicked, it connects to the URL for dribbble.com under the tabs: shots/657044-Hello-World to display a "Hello World" graphic.

First, the variable "_@w@_" in the "body" framing text is instantiated with the directive (enclosed by braces) assigned to "w." For simplicity's sake, no directives are specified for several of the JCM functions that typically would be invoked, notably "header" and "format".

The resulting XML statement reads:

```
<helloWorldExample displayName="Hello World Example">
  <a href='https://dribbble.com/shots/657044-Hello-World' target='_blank'>Hello World</a>
</helloWorldExample>
```

Rendered in a web browser, this XML statement becomes a hyperlinked phrase which points to the specified URL and, when clicked, retrieves a web page containing the graphic in FIG. 7

Example 4: Evaluating a Boolean Expression for Determining Inclusion Status ("Selection")

This example gives a fragment of jCode for determining the inclusion status of a DataStatement (outer braces and other code omitted).

```
"status":
{
  "inclusion": "isPhTpPred",
  "queries":
  [
    {
      "database": "fablab",
      "query": "qrCond_isAppType.sql"
    },
    {
      "database": "fablab",
      "query": "qrCond_isAppGroup.sql"
    },
```

-continued

```
    {
      "database": "fablab",
      "query": "qrCond_isMarkerGroup.sql"
    }
  ]
}
```

The JCM function "status" is invoked to determine the Boolean value of the expression "isPhTpPred", assigned to the key "inclusion"; namely by invoking the function "queries" which in turn executes an array of queries (as indicated by the enclosing brackets, "[", "]"), each of the individual invocations of "query" with a parameter pointing to a file containing a SQL query directed to a database named "fablab"; the outputs returned by the individual queries are evaluated as a Boolean expression to determine the "inclusion" status. In this example, the returned status is true if and only if the union of results from the three referenced SQL queries contains the value isPhTpPred.

Example 5: Context Awareness

This example illustrates the substitution of context variables by the JCM. Consider the SQL query below provided in a .sql file referenced by the data acquisition directive in a jCode program.

```
SELECT    o.OrderId AS caseId,
          o.PoNumber AS poNumber,
          si.SampleName AS sampleName,
          smi.MenuItemCode AS menuItemCode,
          smi.datecreated AS sampleDate,
          o.datecreated AS dateCreated,
          o.lastupdatedtimestamp AS dateAnalyzed
FROM      orders o
JOIN      (SELECT SampleName,
              SampleNo AS SampleNumber,
              OrderId,
              SampleInfoId FROM sampleinfo) AS si
          ON si.OrderId = o.orderid
JOIN      (SELECT SampleInfoId,
              MenuitemCode,
              DateCreated FROM sampleinfo_menuitems) AS smi
          ON si.SampleInfoId = smi.SampleInfoId
WHERE     o.orderid=_@caseId@_ AND o.accountid = '_@userAccountId@_'
```

The WHERE clause contains two context variables, namely a patient case ID, and the ID of the user triggering the jCode program execution in a clinical reporting application. JCM substitutes these two variables with their actual values in the JCM context, prior to executing this SQL statement as part of a data acquisition operation.

Example 6: Nested 2-Level Substitution

The jCode, in the box below, performs a nested substitution. First, it instantiates the substitution variables @genome@_and _@chrom@, in the URL https://api.genome.ucsc.edu/getData/sequence?genome=@genome@; chrom=@chrom@; to that end, it invokes the "built-in" JCM function "linkedParameterSubstitutions" which handles the acquisition of data items from an internal database "fablabdb", for the caseId under consideration (e.g. in the context of generating a clinical report for a genetic test), and their transformation, here into simple text; for the sake of clarity, the database queries representing the parameters for the JCM function "queries", are stated explicitly. Second, it instantiates the variable "_@fromWebService@_" in the "body" framing text, by the data item retrieved from the website accessed via the instantiated URL.

```
{
"reference": "genomeApi",
    "status": { },
    "header": {
        "framingText": "UCSC Genome Knowledge Source",
        "substitution": { }
    },
    "body": {
        "framingText": "Data returned by api.genome.ucsc.edu REST API: _@fromWebService@_",
        "substitution": {
            "fromWebService": {
                "type": "web",
                "spec": {
                    "url": "https://api.genome.ucsc.edu/getData/sequence?genome=_@genome@_;chrom=_@chrom@_",
                    "linkParameterSubstitutions": {
                        "genome": {
                            "type": "sequential",
                            "spec": {
                                "database": "fablabdb",
                                "queries": [
                                    "SELECT genomeCol FROM genomeTable WHERE caseId = '_@caseId@_'"
                                ],
                                "outputFormat": {
                                    "type": "string"
                                }
                            }
                        },
                        "chrom":{
                            "type": "sequential",
                            "spec": {
                                "database": "fablabdb",
                                "queries": [
                                    "SELECT chrCol FROM chrTable WHERE caseId = '_@caseId@_'"
                                ],
                                "outputFormat": {
                                    "type": "string"
                                }
                            }
                        }
                    },
                    "outputFormat": {
                        "type":"text"
                    }
                }
            }
        }
    }
}
```

The resulting DataStatement reads:

```
<genomeApi header="UCSC Genome Knowledge Source">
    description header="Description">Data returned by api.genome.ucsc.edu REST API:</description>
        <fromWebService header="From Web Service">
            <downloadTime header="Download Time">2020:09:16T21:15:30Z</downloadTime>
            <downloadTimeStamp header="Download Time
```

-continued

```
    Stamp">1600290930</downloadTimeStamp>
  <genome header="Genome">hg38</genome>
  <chrom header="Chrom">chrM</chrom>
  <start header="Start">0</start>
  <end header="End">16569</end>
  <dna header="Dna">
    GATCACAGGTCT ... # NOTE: actual statement comprises full sequence </dna>
  </fromWebService>
</genomeApi>
```

When transformed into HTML, the Statement may appear as in Table 2 (depending on the exact nature of the XML to HTML transformation) wherein, instead of the text "DNA sequence" an actual sequence would appear.

TABLE 2

UCSC Genome Knowledge Source

| Description | |
|---|---|
| Data returned by api.genome.ucsc.edu REST API: | |
| From Web Service | |
| Download Time | 2020:09:16T21:15:30Z |
| Download Time Stamp | 1600290930 |
| Genome | hg38 |
| Chrom | chrM |
| Start | 0 |
| End | 16569 |
| Dna | (DNA sequence) |

While related to a variable substitution of type "link" (see Example 3), the variable substitution in this Example has the type "web", but the substitution directives in Example 6 do NOT create a hyperlink. Instead, they retrieve data from the specified (instantiated) URL, cited above and transform the JSON object returned by the external REST API exposed by the website into an XML representation that forms the substitution value for the variable @fromWebService@ within the framing text "Data returned by api.genome.ucsc.edu REST API.

Example 7: Vectorized Creation of Hyperlinked DataStatements

The jCode fragment in this Example, representing only the "body" of a larger jCode object, directs the composition of a set of hyperlinked DataStatements each comprising patient data, intended for a clinical laboratory report, namely alleles of genes encoding certain red blood cell antigens such that the resulting hyperlinked data point to a web site at a designated URL, namely http://erythrogene.com/?q=_@@_'target='_blank'>_@@_from which knowledge items pertaining to the specific alleles of interest are retrieved These alleles, returned by a SQL query in the file "allelePairings.sql," in a first level of variable substitution, are used to instantiate the _@@_variables within the URL director wherein, in this case, this instantiation is vectorized (by way of of the jCode function "columnDecorator"), producing an array of instantiated URL directors, as shown in the XML output produced by the code below. To instantiate the substitution variable _@allelePairings@_, in the framing text, the array is transformed by concatenating the individual URL directors in the array to produce a list of space-separated alleles, namely: KEL KEL*02 KEL*02 RH RHCE*01:01 RHCE*01:06:01.

This entire sequence of operations is compactly encoded in just a few lines of jCode, where, for the sake of clarity, the "header" has been omitted.

```
{
  "reference": "allelePairings",
  "body": {
    "framingText": "Allele pairing(s) compatible with observed genotype profile _@allelePairings@_",
    "substitution": {
      "allelePairings": {
        "type": "sequential",
        "spec":{
          "database": "fablab",
          "queries": [
            "allelePairings.sql"
          ],
          "default": "No data",
          "outputFormat": {
            "type": "xml",
            "columnSeparator": "-",
            "columnDecorators": "<a href='http://erythrogene.com/?q=_@@_' target='_blank'>_@@_</a> ",
            "rowSeparator": "<br>"
          }
        }
      }
    }
  },
  "format": { }
}
```

While "database": "fablab" represents a key:value pair, giving parameter for the "substitution" function, other statements, highlighted in italics, invoke JCM functions; thus, "queries": "allelePairings.sql", invokes a function named "queries" with the parameter "allelePairings.sql" which is the name of a file containing a SQL query. The function retrieves the file, reads and executes the query, in this case a query to an internal database, extracts specific data, in this case alleles of a gene of interest, and stores the result in memory.

The function "outputFormat" invokes several other functions, notably including the function "columnDecorator" which generates multiple instances of the specified URL: in this case, the URL contains 2 (anonymous) substitution variables, "_@@_", and each of these is replaced by one column value in the table returned by the query in "allelePairings.sql".

This jCode produces the following XML output which contains instantiated URL directors for each of a set of pairs of alleles (wherein, for KEL, the members of the pair are identical):

```
<allelePairings header="Allele Pairings">
  Allele pairing(s) compatible with observed genotype profile:
    <a href='http://erythrogene.com/?q=KEL' target='_blank'>KEL</a> -
    <a href='http://erythrogene.com/?q=KEL*02' target='_blank'>KEL*02</a> -
    <a href='http://erythrogene.com/?q=KEL*02' target='_blank'>KEL*02</a> <br>
    <a href='http://erythrogene.com/?q=RH' target='_blank'>RH</a> -
    <a href='http://erythrogene.com/?q=RHCE*01.01' target ='_blank'>RHCE*01.01</a> -
    <a href='http://erythrogene.com/?q=RHCE*01.06.01' target='_blank'>RHCE*01.06.01</a>
</allelePairings>
```

Figure 8:
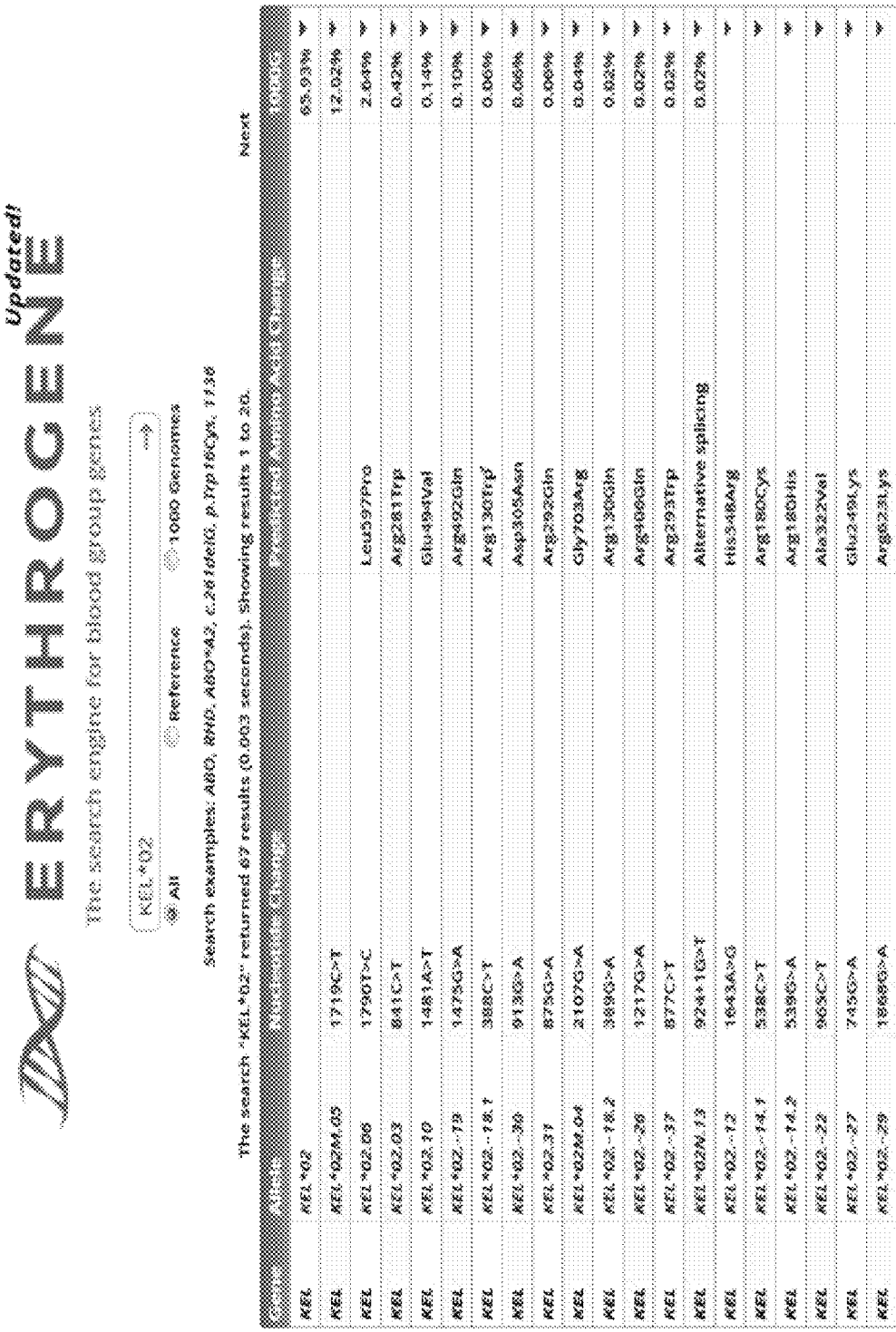
FIG. 8 shows alleles for the KELL blood group from the Erythrogene website.

The statements assigned to href are interpreted by a web browser as hyperlinks; when any of these are clicked, they produce HTML content returned from a database at the external web site pertaining to the allele of interest, such as that shown for "KEL*02" in FIG. 8.

Example 8: Unsupervised Document Assembly from User Input Stored in a JSON Object The process has two steps, namely: first, the construction of DataStatements and/or KnowledgeStatements, and second, their assembly into a document.

First, a web-GUI prompts the user to enter data into data entry fields named in accordance with the general structure of a jCode program, as disclosed in Sect. I. For each of one or more DataStatements or KnowledgeStatements, this interactive entry mode prompts the user with a "key" (taken from a list of such "keys") and enables the user to select a "value" from a drop-down list or other interactive widget. Interactive entry continues until the user terminates entry by clicking on an "Entry Complete" button or until the program exhausts a list of valid "keys". The input so collected is exported to a JSON data object. jCode is provided for acquiring data from this object, and the data transformation directs the requisite variable substitutions to produce DataStatements and/or KnowledgeStatements.

In one embodiment, the structure of the document to be assembled from these DataStatements and/or KnowledgeStatements is assumed to simply reflect the sequence of entries made by the user, implying a flat (non-nested) configuration of the desired document In a preferred embodiment, a DocConfigTable (or its representation passed as a parameter to a DocumentAssembly API) is provided to guide the assembly of a hierarchically organized document, wherein the DocAssembler finds individual statements by way of the "reference" attribute cross-referenced in the DocConfigTable and places them into the document accordingly.

Example 9—Creating a Structured Document by Assembling Data—and KnowledgeStatements This example shows a hierarchically organized XML output produced by DocAssembler, by unsupervised concurrent assembly of Data—and KnowledgeStatements, in this case the "Results" section taken from a clinical report for red cell antigen phenotype prediction (see also Example 1). So as to ultimately render it in HTML, this XML may be converted to "customized" XML which, in this instance, would include the insertion of attributes and formatting instructions relating to the conversion and HTML rendering. The XML below illustrates:

examples of DataStatements, including: <summary, . . . >; <genotypeProfile, . . . > and others comprising items of information representing test results for a specific patient, including genotype, allele and phenotype profiles;

an example of a simple KnowledgeStatement, namely <unusualGenotypes, . . . > which provides an interpretation of a specific element of the genotype profile with implications for clinical decision making an example of a combined DataStatement and KnowledgeStatement, namely <allelePairings, . . . > which reports specific alleles that are, however, wrapped into a URL so as to convert each of them to a hyperlink once the XML is rendered as HTML (see also the related Example 7)

```

<summary header="Results Summary">The patient has these predicted phenotype(s), by system:
    RH, c+e(p)+hrS-hrB-CEAG-;
    KEL, K-k+Kpb+Jsb+;
  </summary>
  <supportingData header="Supporting Data">
    <allelePairings header="Allele Pairings">
      Allele pairing(s) compatible with observed genotype profile:
        <a href='http://erythrogene.com/?q=KEL' target='_blank'>KEL</a> -
        <a href='http://erythrogene.com/?q=KEL*02' target='_blank'>KEL*02</a> -
```

```
            <a href='http://erythrogene.com/?q=KEL*02' target='_blank'>KEL*02</a> <br>
            <a href='http://erythrogene.com/?q=RH' target='_blank'>RH</a> -
            <a href='http://erythrogene.com/?q=RHCE*01.01 target='_blank'>RHCE*01.01</a>
            <a href='http://erythrogene.com/?q=RHCE*01.06.01
    target='_blank'>RHCE*01.06.01</a>
    </allelePairings>
    <genotypeProfile header="Genotype Profile">
        description header="Description">Recorded genotype profile:</description>
        <gType header="Genotype Profile">
            KEL_JS,TT, KEL_KELL,CC, KEL_KP,CC, KEL_JS,TT, KEL_KELL,CC, KEL_KP,CC,
            RH_109,GG, RH_A226P,GG, RH_G336C,GG, RH_L245V,CC, RH_P103S,CC,
            RH_Q233E,CC, RH_V223F,GG, RH_W16C,GC, RH_109,GG, RH_A226P,GG,
            RH_G336C,GG, RH_L245V,CC, RH_P103S,CC, RH_Q233E,CC, RH_V223F,GG,
            RH_W16C,GC
        </gType>
    </genotypeProfile>
</supportingData>
<specialConfigurations header="Special Configurations">
    <antigensAlleles header="Antigens and Alleles">
        <alleleAssociations header="Allele Associations">Known allelic associations:
            none</alleleAssociations>
        <partialAntigens header="Partial Antigens">Predicted partial antigens: Expressed
Partial
            Antigens c,e</partialAntigens>
        <rareAntigens header="Rare Antigens Expressed">Unusual predicted antigen
configurations:
            Rare Antigens Expressed none; Common Antigens NotExpressed none
        </rareAntigens>
    </antigensAlleles>
    <specialVariants header="Special Variants">
        <unusualGenotypes header="Unusual Genotypes">Unusual detected genotypes:
            none</unusualGenotypes>
        <gataMutation header="GATA Mutation">No FY_GATA Mutation</gataMutation>
    </specialVariants>
</specialConfigurations>

```

The specific methods, procedures, and examples described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for programmatically assembling a hierarchically organized document comprising:
    a) providing a document configuration prescribing: the sequencing of document sections, and the mapping of DataStatements and KnowledgeStatements to sections; and
    b) assembling the document by providing DataStatement templates and KnowledgeStatement templates and executing a code for instantiating substitution variables within said templates with data or domain knowledge acquired from designated internal or external data and knowledge sources; and thereby generating the DataStatements and KnowledgeStatements each having status attributes; and optionally also examining the status attribute of DataStatements and KnowledgeStatements, the status attribute indicating whether a particular DataStatement and/or a particular KnowledgeStatement is to be selected for inclusion in the document; and
    c) placing selected DataStatements and KnowledgeStatements into document sections in accordance with the document configuration, whereby the selected DataStatements and KnowledgeStatements are mapped to said document sections.

2. The method of claim 1 wherein the document configuration is a document configuration table.

3. The method of claim 1 wherein the sequencing is nested.

4. The method of claim 1 wherein DataStatements and KnowledgeStatements are created by a code which uses parametrized instructions for acquiring and transforming items of data or items of domain knowledge.

5. The method of claim 4 wherein the code is jCode.

6. The method of claim 1 wherein the assembly proceeds interactively, step by step, so as to create a review workflow.

7. The method of claim 1 wherein DataStatements and KnowledgeStatements are XML or cXML documents.

8. The method of claim 7 wherein XML or cXML documents are translated into HTML.

* * * * *